UNITED STATES PATENT OFFICE.

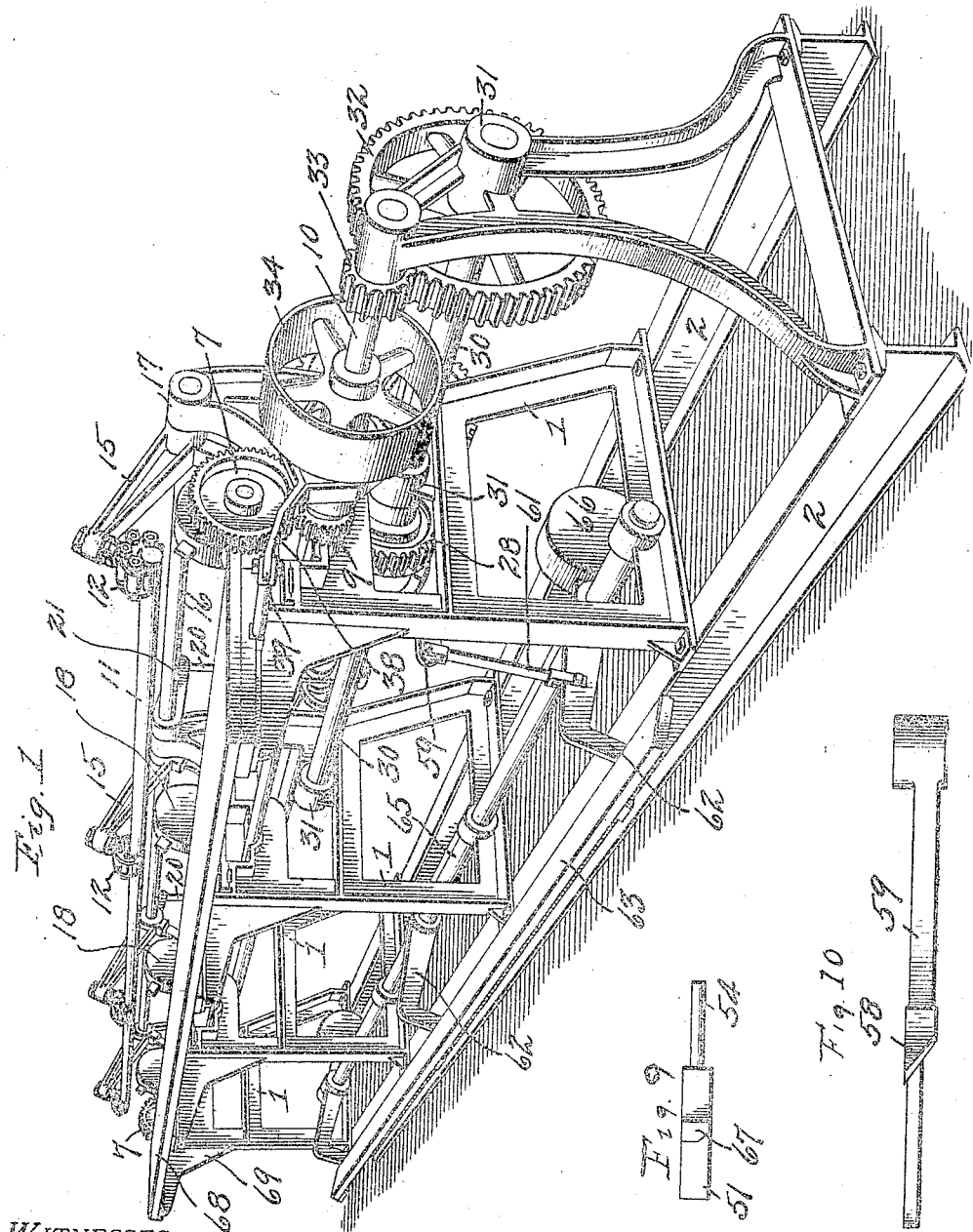

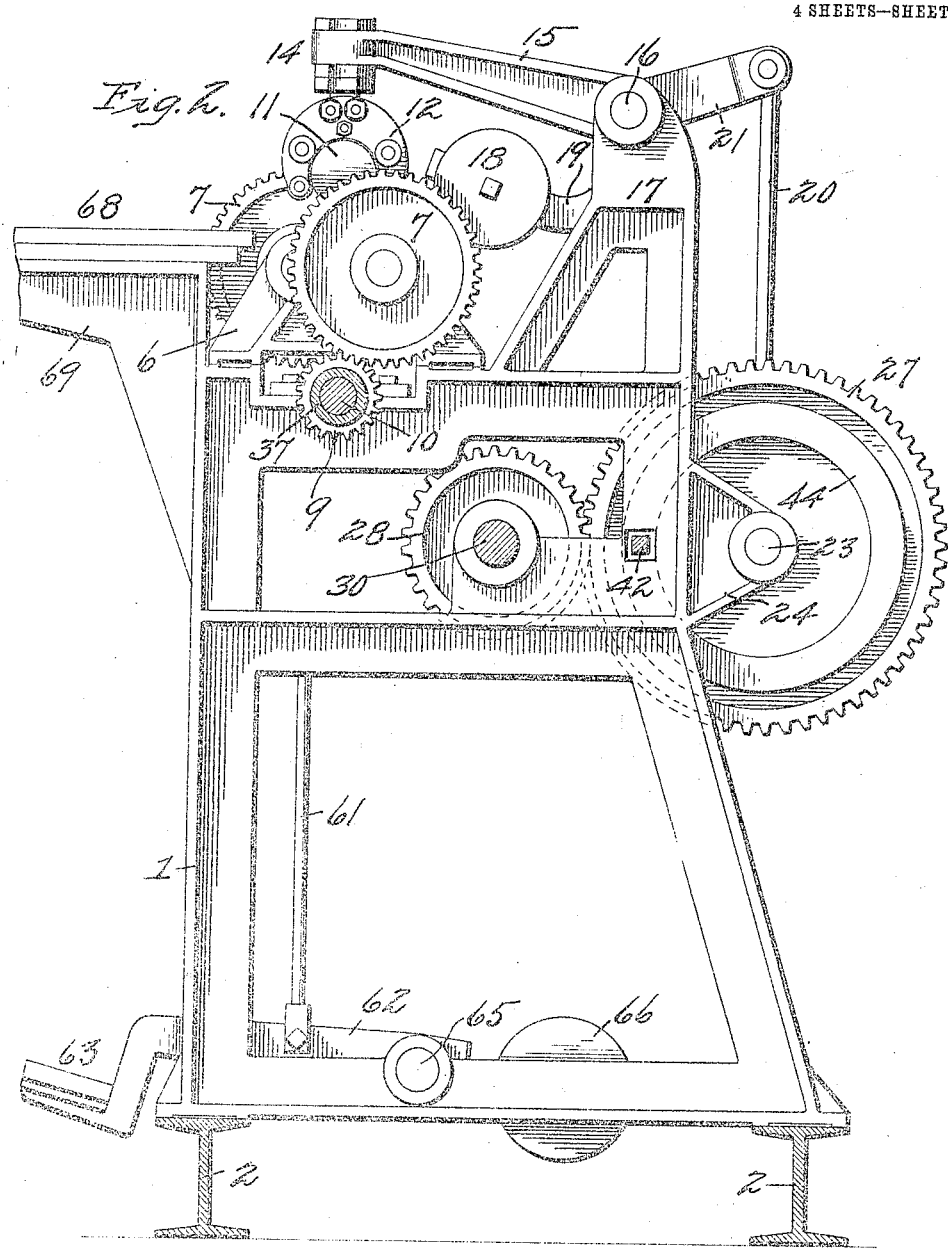

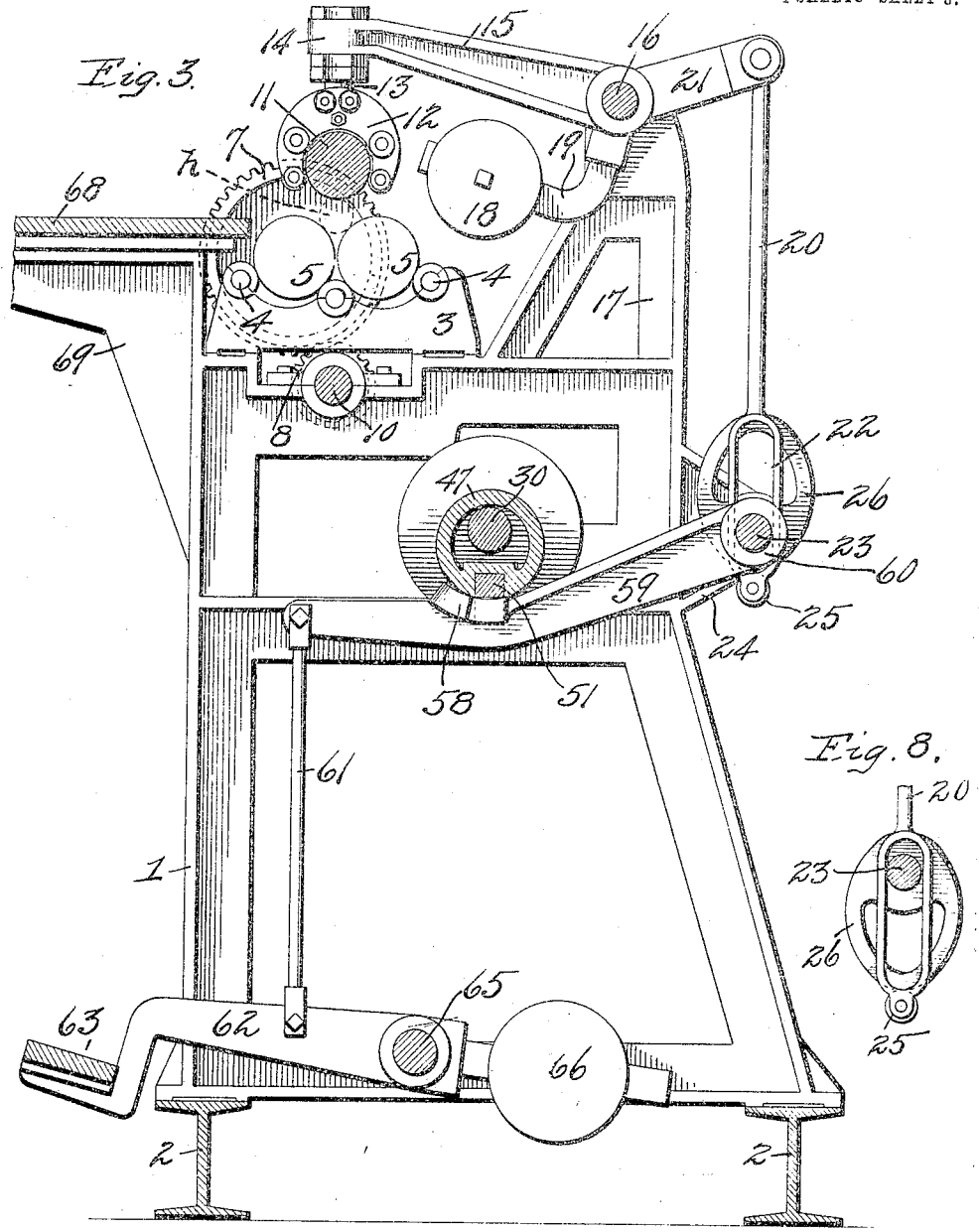

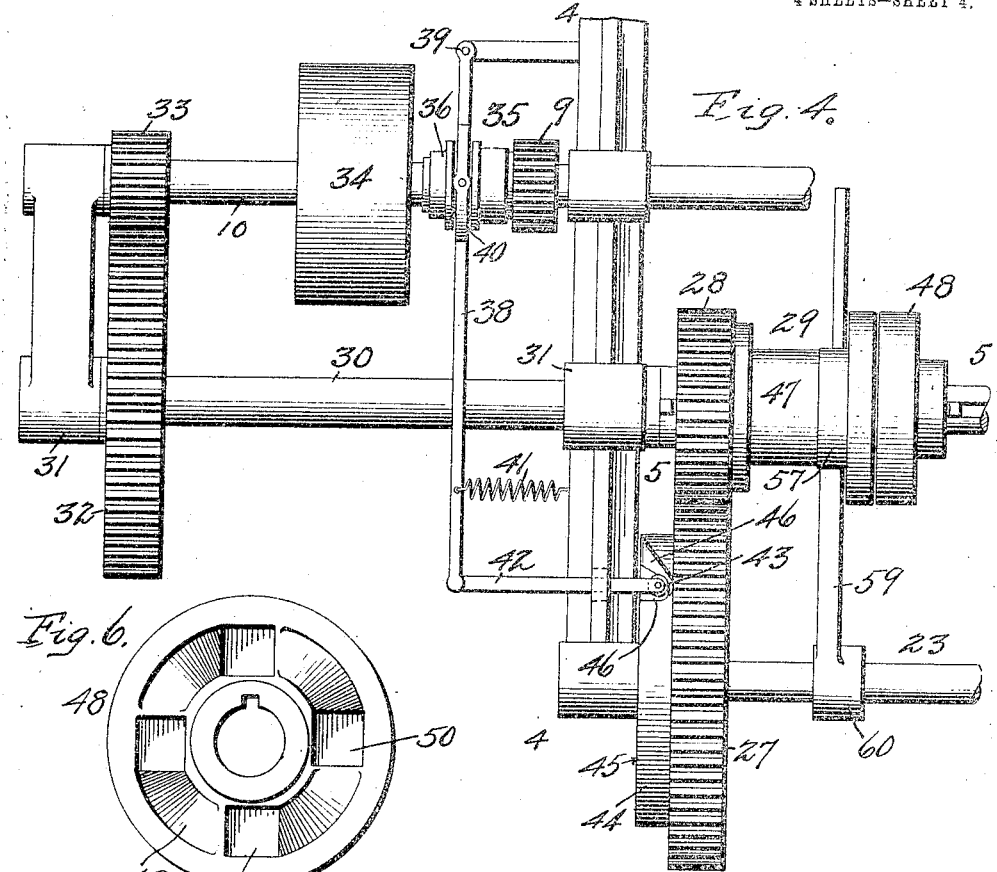

CHARLES R. BACKMANN, OF YOUNGSTOWN, OHIO.

HOSE-MAKING MACHINE.

No. 914,225.  Specification of Letters Patent.  Patented March 2, 1909.

Application filed October 31, 1908. Serial No. 460,414.

*To all whom it may concern:*

Be it known that I, CHARLES R. BACKMANN, a citizen of the United States, residing at Youngstown, in the county of Mahoning and State of Ohio, have invented certain new and useful Improvements in Hose-Making Machines, of which the following is a specification.

This invention relates to the subject of hose making machinery, and has in view a thoroughly practical machine of this character embodying means for carrying out the usual hose making or hose wrapping operation with facility and perfect uniformity.
To this end the invention contemplates a machine constructed along substantial and practical lines which shall provide therein the best possible conditions for the wrapping or making of hose in any desired length preparatory to the vulcanizing operation. In this connection, the invention not only has in view the feature of providing a perfect and uniform rolling operation for the hose, while supported on its mandrel between the several working rolls, but also particularly contemplates an improved controlling mechanism whereby the operator may provide for the automatic starting and stopping of the machinery, and the release and clamping of the hose at exactly the proper intervals, so that the hose making operation may be greatly expedited and carried on with uniformity and despatch.

With these and other objects in view, which will more readily appear as the nature of the invention is better understood, the same consists in the novel construction, combination, and arrangement of parts hereinafter more fully described, illustrated, and claimed.

The essential features of the invention, involved in the construction and arrangement of parts in the controlling mechanism, are necessarily susceptible to structural change or modification without departing from the scope of the invention, but a preferred embodiment thereof is shown in the accompanying drawings, in which:

Figure 1 is a perspective view of a hose making machine constructed in accordance with this invention. Fig. 2 is an end view of the machine on a line of section indicated by the line 2—2 of Fig. 4 of the drawings. Fig. 3 is a vertical transverse sectional view of the machine, on a line of section at one side of the raising and lowering means for the top holding roll of the set of working rolls for the hose. Fig. 4 is a diagrammatic plan view showing the clutch and gear arrangement of the controlling mechanism. Fig. 5 is a longitudinal sectional view on the line 5—5 of Fig. 4, of the intermittent controlling clutch. Fig. 6 is a face view of the fast ratchet clutch disk of the intermittent controlling clutch. Fig. 7 is an end view of the loose sleeve member of the intermittent controlling clutch. Fig. 8 is a detail view showing another position of the lifting cam associated with each pull rod for the top holding roll of the set of working rolls. Fig. 9 is a detail plan view of the reciprocal clutch pin. Fig. 10 is a detail plan view of the clutch control lever.

Like references designate corresponding parts in the several figures of the drawings.

The machine forming the subject matter of this application is designed to be made in varying lengths according to the length of hose to be manufactured therein, and includes in its organization a plurality of upright skeleton frame stands 1 arranged in suitable spaced parallel relation and bolted or otherwise secured to an appropriate base. In the embodiment of the invention shown in the drawings, this base preferably comprises opposite parallel longitudinally arranged base sills 2 consisting of I-beams upon which the frame stands are mounted.

Each of the upright frame stands 1 has mounted on the top edge thereof, an upstanding bearing block 3 carrying a series of anti-friction bearing rollers, or equivalent bearings 4 arranged on the arc of a circle and providing bearing supports for a pair of horizontal rotating bed rolls 5—5. These bed rolls 5—5 extend longitudinally throughout the entire length of the machine and are arranged in the same horizontal plane in side by side relation so as to provide thereon a rolling working support for the hose which is carried upon its mandrel in the position indicated by the dotted lines, as at $h$ in Fig. 3 of the drawings.

The horizontal bed rolls 5—5 have a bearing upon the anti-friction bearings 4 of the entire series of frame stands or supports 1, thus insuring a uniform bracing support for the said rolls throughout the machine, and consequently admitting of rolls of any length being embodied in the machine structure. In addition to these intermediate supports 4, for the said rolls 5, the spindle extremities of the latter are mounted in suitable terminal bearings 6 arranged on the terminal stands 1 of the machine frame, and to provide for imparting a positive drive motion to the said rolls for the purpose of rotating the hose h on its mandrel, one of the spindle extremities of each roll 5 has mounted thereon a gear wheel 7 meshing respectively with the pinions 8 and 9 carried by the main drive shaft 10 upon opposite end portions of said shaft. It will, of course, be understood that any suitable arrangement of gearing may be employed for driving the rolls 5, but the arrangement described is the preferable one, and, as shown in the drawings, involves the feature of having the gear 7 for one of the rolls arranged at one end of the machine and meshing with the pinion 8 at that end, while the gear 7 for the other roll 5 is located at the opposite end of the machine and meshes with the pinion 9, the latter gear element being driven in connection with a driving gear clutch to be hereinafter more particularly referred to.

Coöperating with the pair of bed rolls 5, in the usual manner, is a top holding roll 11. The roll 11 may or may not be positively driven, but for purposes of the present invention is shown as an idle roll arranged longitudinally of the machine, parallel with the bed rolls, and lying in a vertical plane between the vertical planes of said bed rolls, that is, the top roll lies above the contact point of the two bed rolls. The idle top holding roll 11 is preferably supported for loose rotary movement within roller bearing yokes 12, of C form and suspended by means of yoke stems 13 from the front ends 14 of vertically swinging hanger arms 15 carried by a hanger shaft 16 journaled in alined bearings at the upper ends of upright bearing brackets 17 arising from the rear upper corners of the frame stands 1. Usually, in constructing the machine, the number of roller bearing yokes 12 for hanging the top roll 11 correspond to the number of frame stands 1, and hence to the number of bearing supports for the bed rolls 5, and in order to hold the roll 11 normally lowered under yielding pressure upon the hose body being operated upon, suitable pressure means are preferably employed, such as the pressure weights 18 carried upon angle weight arms 19 rigidly carried by the hanger shaft 16 and pendent therefrom, as may be best seen from Fig. 3 of the drawings.

The raising of the top roll 11 is preferably effected through the medium of a plurality of pull rod connections 20 with the rock arms 21 fitted to and projecting to the rear of the shaft 16, any desired number of the connections 20—21 being employed according to the length of the machine. Each pull rod 20 carries at its lower end a clearance yoke 22 having a play over the top roll operating shaft 23 journaled in suitable bearings 24 arranged at the back edges of the frame stands. The lower extremity of each pull rod 20 carries an abutment roller 25, against which operates a rotating lifting cam 26 fitted to and turning with the said top roll operating shaft 23, and this latter shaft derives its motion from an intermittent spur gear 27 fitted to said shaft 23 and meshing with the driven clutch pinion 28 of an intermittent controlling clutch 29 to be presently described. The pinion 28 is one-half the diameter of the spur gear 27 and hence the latter only makes a half revolution to one revolution of the pinion 28, and the said clutch 29 is carried by a counter drive shaft 30 journaled in suitable bearings 31 carried by certain of the frame stands 1. The shaft 30 has mounted thereon a driven spur gear 32 meshing with a driving pinion 33 on the main drive shaft 10 heretofore referred to, and this drive shaft has mounted thereon the drive belt pulley 34, and a driving gear clutch which is designated in its entirety by the reference number 35. The driving gear clutch 35 may be of any approved or standard construction of clutch and is therefore not specifically claimed or detailed herein, so for the purposes of the present invention it may be noted that the said driving gear clutch 35 includes in its organization a movable clutch member 36 having a feathered or equivalent connection with the main drive shaft 10 and adapted to be shifted into clutching and unclutching relation with respect to the normally loose member 37 (see Fig. 2) of the clutch, which member 37 carries the roll driving pinion 9 hereinbefore referred to, and which roll driving pinion meshes with the gear wheel 7 fitted to one of the bed rolls at one end of the machine.

The shifting of the movable clutch member 36 of the clutch 35 is accomplished through a shipper device including a shipper lever 38 pivotally supported at one end, as at 39, and having a yoke 40 connected with the movable clutch member 36. The lever 38 is normally drawn in one direction by a retractile clutch closing spring 41, and opposite its pivoted end carries an operating arm 42 equipped at its extremity with a contact roller 43 held in operative engagement with a cam member 44 projecting from, or carried by, the intermittent spur gear 27 and provided with a uniform dwell surface 45 throughout practically the entire periphery, but interrupted at a single point by a drop-off recess 46 for the roller end of the operating arm 42.

Referring to the intermittent controlling clutch 29 arranged on the counter drive shaft 30, it will be observed from Figs. 5 to 7 inclusive that this clutch essentially comprises a loose sleeve member 47, and a fast clutch disk 48. The clutch disk 48 is keyed or otherwise secured fast to the shaft 30 and is provided at one side with a circular ratchet face 49 including therein a plurality of regularly spaced keeper sockets 50 forming the catch shoulders of the ratchet face and adapted to receive the nose of a reciprocal clutch pin 51 slidably mounted in alined guide openings 52 provided in different portions of the sleeve member 47 and normally projected toward the clutch disk 48 through the medium of a thrust spring 53 coiled on the stem 54 of the clutch pin and housed in a suitable spring socket 55 provided therefor. Preferably, the loose sleeve member 47 is provided at one end with a cover flange 56 for the ratchet face 49 of the disk 48, and at its opposite end has keyed or otherwise suitably secured thereto the clutch pinion 28 hereinbefore referred to. The loose sleeve member 47 of the clutch 29 also is provided thereon at one side of the flange 56 with a smooth annular riding surface 57 for the wedge shaped cam piece 58 of a clutch control lever 59 which is pivotally hung at one end, as at 60, on the top roll operating shaft 23, and the other end of which has a pull rod connection 61 with one of the rocker arms 62 of a foot treadle 63 which is carried upon a plurality of said rocker arms 62 mounted upon a rocking treadle shaft 65, to which shaft is connected overbalance lift weights 66, or equivalent means for normally holding the cam piece 58 of the lever 59 against the clutch member 47 and in operative relation to the inclined or wedged tappet lug 67 which is carried by, and projects from, an intermediate part of the clutch pin 51. With this relation of parts, the rotation of the clutch 29, when engaged, carries the lug 67 against and over the wedge piece 58 with the result of retracting the clutch pin 51 and disengaging the clutch.

The frame of the machine is equipped with a suitable feed table 68 supported on brackets 69 at the front side of the machine. This table is arranged substantially in the horizontal plane of the tops of the bed rolls 5 and is utilized for feeding the wrappings to the hose body which is rotated between the sets of rolls 5—5, and 11.

Referring more particularly to the action of the machine and the controlling mechanism, it may be assumed that the treadle is held normally elevated with the control lever thereof in position for holding the clutch pin 51 out of engagement, and hence holding the intermittent controlling clutch open or disengaged. Also, it will be understood that the spring 41 serves to engage the driving gear clutch 35, while the roller and cam 43 and 44 operate to disengage the said driving gear clutch 35. Now, when the treadle is pressed down, the clutch control lever 59 is lowered out of engagement with the tappet lug 67, thus permitting the spring 53 to come into play and automatically engage the clutch 29 with the result of the clutch pinion 28 commencing to rotate and transmit its motion to the intermittent spur gear 27. This gear in turn causes its cam projection 44 to press the arm 42 of the shipper device outward and thereby disengaging the driving gear clutch 35 and consequently stopping the rotation of the bed rolls 5—5. At the same time, the top roll 11 is automatically raised by the action of the lifting cams 26 against the abutments 25 of the pull rods 20. When the driving clutch 29 has made one revolution, the tappet lug 67 automatically passes over the cam piece 58 of the control lever 59 and disengages the clutch 29. This occurs when the intermittent spur gear 27 has completed a half revolution, which is sufficient to completely lift the top roll 11 and bring the lifting means to the position shown in detail Fig. 8 of the drawings. The same action takes place to provide for lowering the top roll 11 and starting the movement of the bed rolls 5—5.

In connection with the starting operation, it should be noted that while the top roll is lowering into its operative position, the two bed rolls are not running, but immediately upon the top roll reaching its operative relation to the bed rolls, the said bed rolls automatically start. This is caused by the relative arrangement of the cams 26 with relation to the drop-off recess 46 of the cam projection 44 of the gear 47. That is, when said cams are in the position shown in Fig. 8 with the top roll elevated, the contact end of the shipper operating arm 42 is on the high side 45 of the cam 44, thus holding the roll driving gear clutch 35 disengaged. Now, assuming the parts to be in the position shown in Fig. 8, when the treadle is depressed to disengage the lever 59 from the intermittent clutch, the latter clutch becomes engaged and motion is transmitted from the pinion 28 to the gear 27 with the result of turning the said gear 27 one-half revolution. This one-half revolution reverses the position of the cams 26, and at the same time brings the drop-off recess 46 to the point where (when the top roll reaches its lowered position) the spring of the shipper device is permitted to come into play and engage the roll driving gear clutch, thus automatically starting the two bed rolls. Hence, to stop and start the machine and simultaneously raise and lower the top roll 11, it is simply necessary for the operator to depress the treadle 63 to permit the intermittent clutch to become engaged, and then immediately remove the pressure from the treadle to permit the control lever to fly back to operative position.

Various changes in the form, proportion, and minor details of construction may be resorted to without departing from the spirit or sacrificing any of the advantages of the invention.

I claim:

1. In a machine of the class described, the machine stand, rotating bed rolls, means for driving the bed rolls, a top holding roll, and a controlling mechanism comprising means for automatically stopping the bed rolls and simultaneously lifting the top roll, and also comprising means for lowering the top roll and automatically starting the bed rolls when the top roll has reached its lowered position.

2. In a machine of the class described, the machine stand, rotating bed rolls, means for driving said rolls, a top holding roll, raising and lowering connections for said top roll, and a controlling mechanism comprising means for stopping the bed rolls and simultaneously raising the top roll through said raising and lowering connections, and also comprising means for lowering the top roll through said connections, and automatically starting the rotation of the bed rolls when the top roll reaches its lowered operative position.

3. In a machine of the class described, the machine stand, rotating bed rolls, roll driving gearing including a driving gear clutch for throwing said gearing in and out of action, a top holding roll, raising and lowering means for said top roll, and a controlling mechanism comprising means for simultaneously controlling said driving gear clutch and operating the said raising and lowering means for the top roll, 4. In a machine of the class described, the machine stand, rotating bed rolls, roll driving gearing including a driving gear clutch for throwing said gearing in and out of action, a top holding roll, raising and lowering means for said top roll, and a controlling mechanism comprising means for simultaneously controlling the said driving gear clutch and synchronously operating the said raising and lowering means for the top roll.

5. In a machine of the class described, the machine stand, rotating bed rolls, roll driving gearing for said bed rolls including a driving gear clutch, a top holding roll, vertically swinging supports for said top roll, raising and lowering means connected with said supports, and a controlling mechanism operatively related to said raising and lowering means and to said driving gear clutch, and comprising means for effecting a synchronous action thereof.

6. In a machine of the class described, the machine stand, rotating bed rolls, roll driving gearing including a driving gear clutch, a top holding roll, vertically swinging hanger arms carrying a top roll, means for normally depressing the hanger arms, a top roll operating shaft carrying a lifting cam, a pull connection with the hanger arms engaged by said lifting cam, and a controlling mechanism comprising means for controlling said driving gear clutch and synchronously rotating said top roll operating shaft.

7. In a machine of the class described, the machine stand, rotating bed rolls, roll driving gearing including a driving gear clutch, a top holding roll, a vertically swinging hanger for the top roll, means for normally depressing said hanger, a top roll operating shaft operatively connected with the hanger for lifting the same, and a controlling mechanism comprising means for synchronously operating the driving gear clutch and rotating said top roll operating shaft.

8. In a machine of the class described, the machine stand, rotating bed rolls, roll driving gearing including a driving gear clutch, a top holding roll, a vertically swinging hanger for the top roll, means for normally depressing said hanger, a top roll operating shaft operatively connected with the hanger for lifting the same, and a treadle controlled controlling mechanism comprising means for synchronously operating the driving gear clutch and rotating said top roll operating shaft.

9. In a machine of the class described, the machine stand, rotating bed rolls, roll driving gearing including a driving gear clutch, a top holding roll, a vertically swinging hanger for said top roll, raising and lowering means for said hanger including a top roll operating shaft, and a treadle controlled controlling mechanism comprising means for operating the driving gear clutch and also for imparting to said top roll operating shaft a half revolution at a time.

10. In a machine of the class described, the machine stand, rotating bed rolls, a roll driving gearing including a driving gear clutch, a top holding roll, a vertically swinging hanger for said top roll, raising and lowering means for the hanger including a top roll operating shaft, a cam spur gear on said top roll operating shaft, a suitably driven intermittent controlling clutch geared with said cam spur gear, a treadle control for the intermittent clutch, and a spring retracted shipper device operated in one direction by said cam spur gear and having an operative connection with the driving gear clutch.

11. In a machine of the class described, the machine stand, rotating bed rolls, roll driving gearing including a driving gear clutch, a top holding roll, raising and lowering means for the top roll including a top roll operating shaft, an intermittent spur gear carried by the top roll operating shaft and having a cam projection provided with a single drop-off point, an intermittent controlling clutch geared with said spur gear, a treadle control for the intermittent clutch, and a spring retracted shipper device having a contact element coöperating with said cam, said shipper device being operatively connected with the movable element of the driving gear clutch.

12. In a machine of the class described, the machine stand, rotating bed rolls, roll driving gearing including a driving gear clutch, a top holding roll, raising and lowering means for the top roll including a top roll operating shaft, an intermittent spur gear mounted on said latter shaft and having at one side a cam provided with a single drop-off recess, an intermittent controlling clutch geared with said spur gear, a treadle control for said intermittent clutch, and a spring retracted shipper device operatively connected with the movable member of the driving gear clutch and having a contact element engaging said cam and the drop off recess thereof.

13. In a machine of the class described, the machine stand, rotating bed rolls, roll driving gearing including a driving gear clutch, a top holding roll, raising and lowering means for the top roll including an operating shaft, a cam spur gear carried by the top roll operating shaft, a shipper device operatively engaged with said spur gear and with said driving gear clutch, and a treadle controlled intermittent controlling clutch geared with said spur gear and with said roll driving gear, said intermittent controlling clutch comprising a fast clutch disk and a loose sleeve member carrying an automatically released clutch pin engaging with said clutch disk.

14. In a machine of the class described, the machine stand, rotating bed rolls, roll driving gearing including a driving gear clutch, a top holding roll, raising and lowering means for the top roll, an intermittent controlling clutch operatively connected with said raising and lowering means and also with said roll driving gearing, said intermittent controlling clutch comprising a fast clutch disk having keeper sockets, a loose sleeve member carrying a clutch pinion, and a spring projected clutch pin carried by said sleeve member and engaging the socket of the clutch disk, and a treadle device including a control lever arranged to automatically engage and release said clutch pin.

15. In a machine of the class described, the machine stand, rotating bed rolls, roll driving gearing for the bed rolls, a top holding roll, raising and lowering means for the top roll, an intermittent controlling clutch geared with said raising and lowering means and with said roll driving gearing, said clutch including a fast clutch disk having a plurality of keeper sockets, a loose sleeve member carrying a clutch pinion, and a spring projected clutch pin engaging the sockets of the disk and having a tappet lug, and a treadle device having a normally elevated clutch control lever provided with a cam piece normally lying in the path of the tappet lug and adapted to automatically engage the same and release the clutch pin.

In testimony whereof I hereunto affix my signature in the presence of two witnesses.

CHARLES R. BACKMANN.

Witnesses:
HORACE F. SMITH,
H. L. HENDRICKSEN